United States Patent
Fujiki

(10) Patent No.: US 12,337,486 B2
(45) Date of Patent: Jun. 24, 2025

(54) ABNORMALITY DETECTION METHOD IN TWIN-MOTOR-DRIVEN ROBOT

(71) Applicant: NACHI-FUJIKOSHI CORP., Tokyo (JP)

(72) Inventor: Keiji Fujiki, Tokyo (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 394 days.

(21) Appl. No.: 18/074,951

(22) Filed: Dec. 5, 2022

(65) Prior Publication Data
US 2023/0173679 A1 Jun. 8, 2023

(30) Foreign Application Priority Data

Dec. 8, 2021 (JP) ................. 2021-199394

(51) Int. Cl.
*B25J 9/16* (2006.01)
*B25J 19/00* (2006.01)
(Continued)

(52) U.S. Cl.
CPC ......... *B25J 9/1674* (2013.01); *B25J 19/0004* (2013.01); *G01L 5/28* (2013.01); *G01M 13/00* (2013.01)

(58) Field of Classification Search
CPC . G01P 3/44; G01M 13/00; G01B 7/30; B66D 5/00; B66B 1/32; B60T 17/221; B26D 3/08; G05B 19/406; G05B 2219/41279; H02P 3/04; H02P 2203/09; H02P 2205/01; H02P 29/0241; H02P 3/00; G01L 5/28; G01L 3/18; F16D 2121/22; F16D 59/02; F16D 63/002; F16D 66/00; F16D 1/101; F16D 2001/103; F16D 2055/0058; F16D 2065/1368; F16D 2065/1396; F16D 2066/003; F16D 2066/006; F16D 2121/20; F16D 2300/22; F16D 3/06; F16D 55/28; F16D 65/186; F16D 66/021; F16D 66/025; F16D 71/04; B25J 19/0004; B25J 9/1674; B25J 19/06; B25J 19/066; B25J 9/04
See application file for complete search history.

(56) References Cited

U.S. PATENT DOCUMENTS

| | | | |
|---|---|---|---|
| 2014/0000355 A1* | 1/2014 | Shikagawa | G01L 5/28 73/118.01 |
| 2016/0156288 A1* | 6/2016 | Sawamura | H02P 3/04 318/372 |
| 2019/0344437 A1* | 11/2019 | Shinagawa | F16D 63/002 |

FOREIGN PATENT DOCUMENTS

| | | |
|---|---|---|
| JP | 201410546 A | 6/2016 |
| JP | 2018099748 A | 6/2018 |
| JP | 6545418 B | 6/2019 |

* cited by examiner

*Primary Examiner* — Kristina M Deherrera
*Assistant Examiner* — Gedeon M Kidanu
(74) *Attorney, Agent, or Firm* — Lippes Mathias LLP

(57) ABSTRACT

An operation controller configured to give a fine operation command to a master shaft in a state in which servomotors are excited and respective excitation brakes of the master shaft and the slave shaft are released, and an abnormality detector configured to perform detection of an abnormality of the excitation brake of the slave shaft by detecting an operation amount of the slave shaft that is obtained when the slave shaft is finely operated in accordance with the fine operation command to the master shaft in a controlled manner, and comparing the operation amount with a reference value are included.

3 Claims, 3 Drawing Sheets

(51) Int. Cl.
*G01L 5/28* (2006.01)
*G01M 13/00* (2019.01)

ABNORMALITY DETECTION METHOD IN TWIN-MOTOR-DRIVEN ROBOT

BACKGROUND

This application claims priority to Japanese Serial No. 2021-199394, filed Dec. 8, 2021. The disclosure of which is herein incorporated by reference.

TECHNICAL FIELD

The present invention relates to a brake abnormality detection system and a brake abnormality detection method in a twin-motor-driven robot.

RELATED ART

An industrial robot generally includes a brake-equipped motor. A brake is used to maintain the posture of a robot when a motor is stopped.

In addition, an industrial robot includes a vertical multi-joint robot arm including a plurality of joints supported on a base. The robot arm includes a plurality of sequentially-coupled joints. An end effector is attached to the leading end of the robot arm.

Each joint is provided with an excitation brake-equipped motor serving as an example of an actuator that relatively rotates two members coupled by the corresponding joint. In addition, the excitation brake will be hereinafter simply referred to as a brake.

Here, in the brake-equipped motor, when accretion (for example, grease) adheres to a friction plate of the brake, a braking torque required by the brake drastically declines, and when the excitation of the motor is stopped, the posture of the robot such as a robot arm, for example, can become unable to be maintained. This is a brake abnormality that moves a motor because a brake fails to be actuated properly due to the accretion although the brake is actuated.

In addition, an abnormality that locks the movement of a motor due to the actuation of a brake although the brake is not actuated has also been known as a brake abnormality.

Several configurations have been known as detection configurations of such a brake abnormality.

For example, as in JP 2014-010546 A, there has been known a system that diagnoses whether or not a brake has an abnormality, based on a position deviation, in a state in which a motor is excited and the brake is actuated, to deal with the above-described failure in which the brake fails to be actuated although the brake is actuated.

JP 6545418 B discloses diagnosing the presence or absence of an abnormality of a brake while gradually increasing current to be supplied to a motor, in a state in which the brake is closed, and checking a brake torque estimated from the current, against a reference angle, to deal with the above-described failure in which the brake fails to be actuated although the brake is actuated.

Furthermore, JP 2018-099748 A discloses a system that diagnoses the presence or absence of an abnormality of a brake by measuring voltage applied when the brake is released, and comparing the voltage with a reference value, to deal with both of the above-described brake abnormalities.

SUMMARY

On the other hand, there is a configuration of coupling rotations of two motors and generating a double torque in a case where a large torque is required by a rotational shaft of an arm in a robot, for example.

In such a so-called twin-motor-driven robot (robot driven by twin motors), the abnormality diagnosis systems as disclosed in JP 2014-010546 A, JP 6545418 B, and JP 2018-099748 A cannot be applied to a slave shaft thereof.

This is because the twin-motor-driven robot includes a master shaft (servomotor) to which a position command is given, and a slave shaft (servomotor) that follows the master shaft, and abnormality detection that is based on a position deviation as in the above-described example cannot be applied to the slave shaft since the slave shaft is subjected only to current control and a position command does not exist.

Furthermore, for the sake of control, the master shaft and the slave shaft simultaneously move, and current cannot be flowed only to one of the motors provided with them. In addition, the master shaft and the slave shaft are connected via a decelerator and a manipulator output shaft, and if one moves, the other one receives the influence. Thus, there has been such a problem that the diagnosis of a brake abnormality of the slave shaft is difficult.

Accordingly, a main object of the present invention is to provide a brake abnormality detection system in a twin-motor-driven robot and a brake abnormality detection method in a twin-motor-driven robot that can accurately detect a brake abnormality that locks the movement of a motor due to actuation of a brake although the brake is not actuated for a slave shaft in a twin-motor-driven robot.

The aspect of the present invention that has solved the above-described problems is as follows.

First Aspect

A brake abnormality detection system in a twin-motor-driven robot according to an aspect of the present invention is a brake abnormality detection system in a twin-motor-driven robot including a master shaft of a servomotor equipped with an excitation brake, and a slave shaft of a servomotor equipped with an excitation brake, which are connected with a manipulator output shaft via respective decelerators, and the brake abnormality detection system includes an operation controller configured to give a fine operation command to the master shaft in a state in which the servomotors are excited and the respective excitation brakes of the master shaft and the slave shaft are released, and an abnormality detector configured to perform detection of an abnormality of the excitation brake of the slave shaft by detecting an operation amount of the slave shaft that is obtained when the slave shaft is finely operated in accordance with the fine operation command to the master shaft in a controlled manner, and comparing the operation amount with a reference value.

Second Aspect

A brake abnormality detection method in a twin-motor-driven robot according to an aspect of the present invention is a brake abnormality detection method in a twin-motor-driven robot including a master shaft of a servomotor equipped with an excitation brake, and a slave shaft of a servomotor equipped with an excitation brake, which are connected with a manipulator output shaft via respective decelerators, and the brake abnormality detection method includes giving a fine operation command to the master shaft in a state in which the servomotors are excited and the respective excitation brakes of the master shaft and the slave shaft are released, and performing detection of an abnormality of the excitation brake of the slave shaft by detecting an operation amount of the slave shaft that is obtained when the slave shaft is finely operated in accordance with the fine operation command to the master shaft in a controlled manner, and comparing the operation amount with a reference value.

According to the present invention, there are provided a brake abnormality detection system in a twin-motor-driven robot and a brake abnormality detection method in a twin-motor-driven robot that can accurately detect a brake abnormality that locks the movement of a motor due to actuation of a brake although the brake is not actuated for a slave shaft in a twin-motor-driven robot.

DETAILED DESCRIPTION

Figure 1:
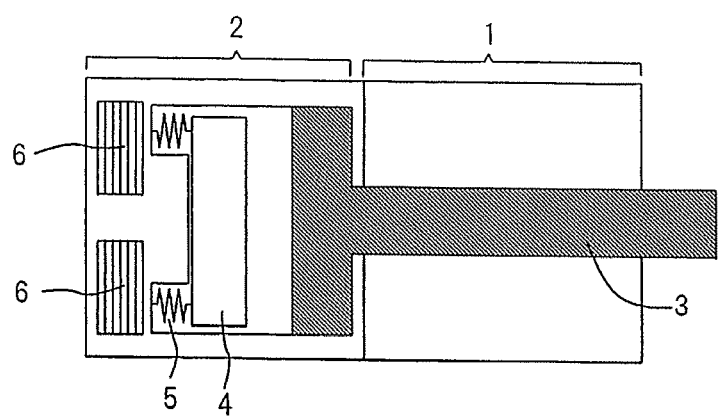
FIG. 1 is a diagram illustrating an overview of an excited state of a non-excitation actuated-type brake-equipped motor.

Hereinafter, an embodiment of the present invention will be described with reference to the drawings. In addition, to facilitate the understanding of description, the same components and steps in the drawings are assigned the same reference signs as far as possible, and the redundant description will be omitted.

First of all, a non-excitation actuated-type brake-equipped motor will be described with reference to FIG. 1. A brake 2 is provided for a motor 1 having an output shaft 3.

The brake 2 includes a brake pad 4 and an excitation coil 6, and a mechanical spring 5 interposed between these.

If current flows to the excitation coil 6, as illustrated in FIG. 1, the brake pad 4 is attracted by magnetic force of the excitation coil 6, the brake pad 4 moves up to a release position, and the output shaft 3 enters a released state.

Figure 2:
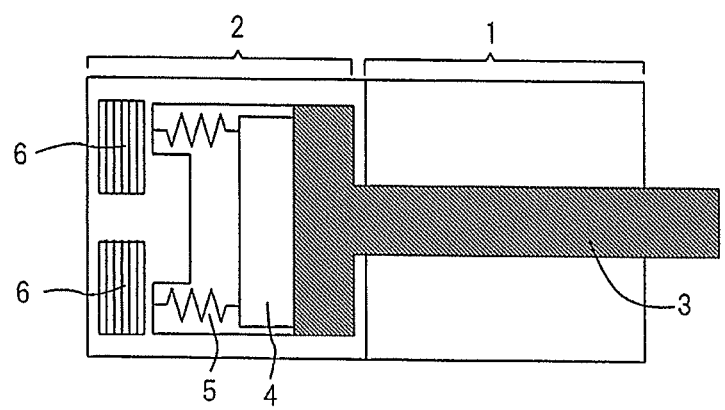
FIG. 2 is a diagram illustrating an overview of a non-excited state of a non-excitation actuated-type brake-equipped motor.

In contrast to this, if current to the excitation coil 6 is blocked, as illustrated in FIG. 2, magnetic force of the excitation coil 6 becomes 0, the brake pad 4 moves to a clamp position by elastic force of the mechanical spring 5, and the output shaft 3 enters a clamped state.

There is a configuration of coupling rotations of two motors and generating a double torque in a case where a large torque is required for a rotational shaft of an arm in a robot. In this configuration, a pair of non-excitation actuated-type brake-equipped motors in the above-described example is provided.

Figure 3:
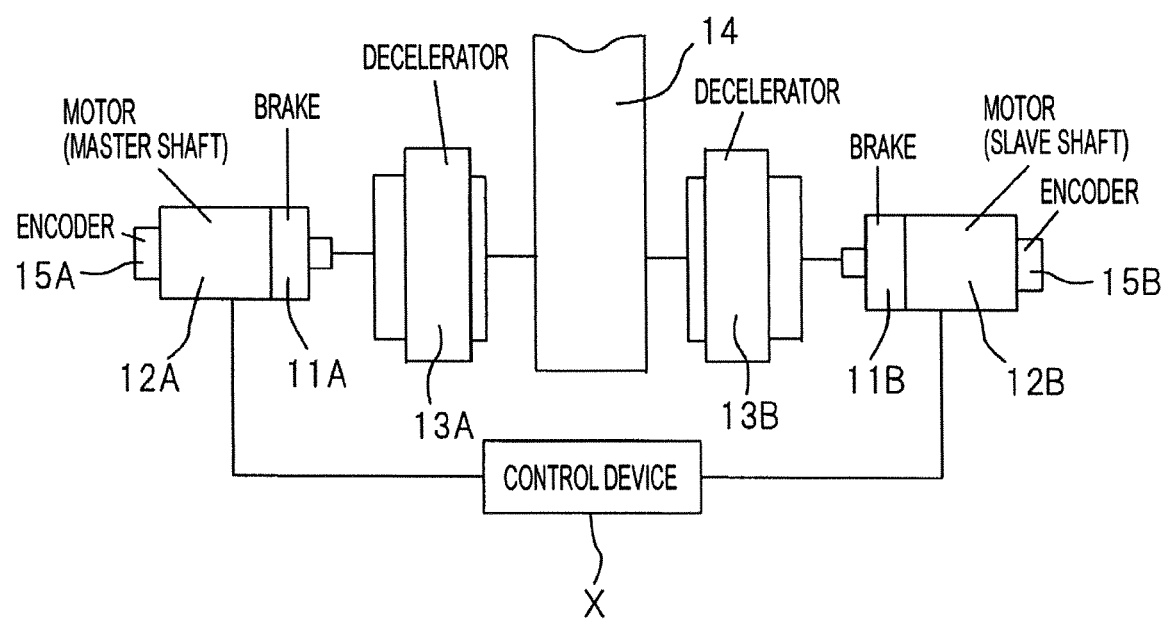
FIG. 3 is a diagram illustrating an overview of a coupled state in a twin-motor-driven robot.

Specifically, for example, as illustrated in FIG. 3, a servomotor 12A provided with a master shaft equipped with a brake 11A constituting the brake 2, and a servomotor 12B constituting a slave shaft equipped with a brake 11B constituting the brake 2 are connected with a manipulator output shaft 14 via a decelerator 13A and a decelerator 13B, respectively.

Figure 4:
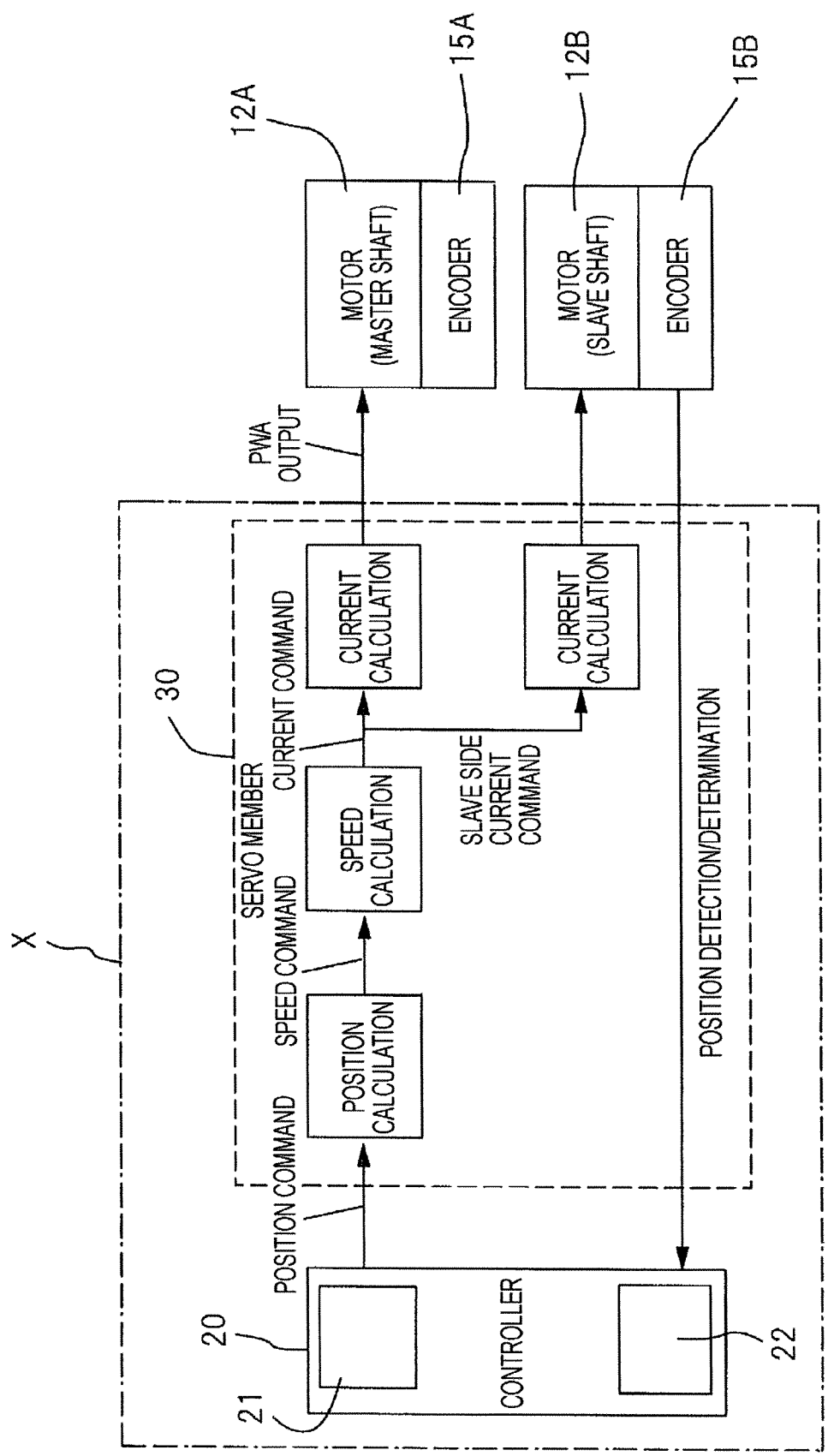
FIG. 4 is a flowsheet of a control system.

Referring also to a control flow of a servo control device X in FIG. 4, as for the servomotor 12A provided with the master shaft, a position command signal is given from a controller 20 to a servo member 30, position calculation is performed, speed calculation is performed based on a speed command, calculation of a current value to be actually given is performed, and the current value is given to the servomotor 12A as an output to the motor. A current value to be given to the servomotor 12B is determined based on the current value to be given to the servomotor 12A.

For example, in a control system having such a configuration, target position control is performed while a current position information from an encoder (rotational position detector) 15A attached to the servomotor 12A, and a current position information from an encoder (rotational position detector) 15B attached to the servomotor 12B, being momentarily taken into the controller 20.

Abnormality detection of the brake 11B of the servomotor 12B constituting the slave shaft is performed as follows.

In a state in which the servomotor 12A and the servomotor 12B are excited and the brakes 11A and 11B are released, as illustrated in FIG. 4, a fine operation command is given from an operation controller 21 only to the master shaft (the servomotor 12A).

Consequently, a part of current of the fine operation command flows to the servomotor 12B provided with the slave shaft, and the slave shaft finely operates in accordance with the fine operation command to the master shaft in a controlled manner.

Abnormality detection is performed by detecting an operation amount of the slave shaft (the servomotor 12B) that is obtained when the slave shaft performs the fine operation, using the encoder (rotational position detector) 15B, for example, and comparing the detected operation amount with a reference value of an operation amount. The controller 20 includes an abnormality detector 22 for the detection.

For example, if a fine operation amount of the slave shaft is larger than the reference value, it is determined that the brake 11B for the slave shaft has no failure.

Alternatively, if the fine operation amount is 0 or equal to or smaller than the reference value, a brake failure can be determined assuming that the brake 11B for the slave shaft is not released.

In addition, it is desirable that the fine operation command is at a level of being absorbed into the decelerators 13A and 13B, and the manipulator output shaft 14, and not exerting physical influence on the slave shaft 12B.

As described above, a slave side brake abnormality and a failure in a twin-motor-driven robot can be detected.

Moreover, a robot stop caused by a secondary failure attributed to this can be prevented before the robot stop happens.

The present invention can be applied to a working machine and the like in addition to an industrial robot such as a multijoint robot, and the present invention also includes these as targets.

What is claimed is:

1. A brake abnormality detection system in a twin-motor-driven robot including a master shaft of a servomotor equipped with an excitation brake, and a slave shaft of a servomotor equipped with an excitation brake, which are connected with a manipulator output shaft via respective decelerators, the brake abnormality detection system comprising:

an operation controller configured to give a fine operation command to the master shaft in a state in which the servomotors are excited and the respective excitation brakes of the master shaft and the slave shaft are released; and an abnormality detector configured to perform detection of an abnormality of the excitation brake of the slave shaft by detecting an operation amount of the slave shaft that is obtained when the slave shaft is finely operated in accordance with the fine operation command to the master shaft in a controlled manner, and comparing the operation amount with a reference value.

2. The brake abnormality detection system in a twin-motor-driven robot according to claim 1,
wherein the fine operation command is at a level of being absorbed into the decelerators and the manipulator output shaft, and not causing the slave shaft to perform physical following.

3. A brake abnormality detection method in a twin-motor-driven robot including a master shaft of a servomotor equipped with an excitation brake, and a slave shaft of a servomotor equipped with an excitation brake, which are connected with a manipulator output shaft via respective decelerators, the brake abnormality detection method comprising:
giving a fine operation command to the master shaft in a state in which the servomotors are excited and the respective excitation brakes of the master shaft and the slave shaft are released; and
performing detection of an abnormality of the excitation brake of the slave shaft by detecting an operation amount of the slave shaft that is obtained when the slave shaft is finely operated in accordance with the fine operation command to the master shaft in a controlled manner, and comparing the operation amount with a reference value.

* * * * *